United States Patent Office 3,732,287
Patented May 8, 1973

3,732,287
BISMONOCARBOXYLIC ESTERS OF 3-FORMYLBUTANEDIOL-1,2
Walter Himmele, Walldorf, and Werner Aquila, Ludwigshafen, Germany, assignors to Badische Anilin- & Soda-Fabrik Aktiengesellschaft, Ludwigshafen (Rhine), Germany
No Drawing. Filed Sept. 1, 1970, Ser. No. 68,785
Claims priority, application Germany, Sept. 9, 1969,
P 19 45 479.6
Int. Cl. C07c 69/78, 45/08, 175/00
U.S. Cl. 260—476 R     3 Claims

ABSTRACT OF THE DISCLOSURE

Bismonocarboxylic esters of 3-formylbutanediol-1,2 and their production by reaction of bismonocarboxylic esters of butene-1-diol-3,4 with carbon monoxide and hydrogen in the presence of carbonyl complexes of rhodium at elevated temperature and superatmospheric pressure. Bismonocarboxylic esters of 3-formylbutanediol-1,2 are used for the production of β-formylcrotyl esters which are valuable starting materials for the production of vitamin A esters.

---

This invention relates to bismonocarboxylic esters of 3-formylbutanediol-1,2 and to a process for their production by the oxo reaction.

The oxo reaction is a method generally used in industry for the production of aldehydes in which olefinically unsaturated compounds are reacted with carbon monoxide and hydrogen in the presence of carbonyl complexes of metals of Group VIII of the Periodic System, for example cobalt carbonyl. In addition to olefins, a number of olefinically unsaturated compounds which contain functional groups have been reacted by the oxo process. Thus, it is known from J. Amer. Chem. Soc., 71, 3053 (1949) that γ-acetoxybutyraldehyde is obtained from allyl acetate by the oxo process.

It was therefore to be expected that bismonocarboxylic esters of 4,5-dihydroxypentanal-1 would be obtained in the reaction of bis-monocarboxylic esters of butene-1-diol-3,4 by the oxo process, because the starting material used has the structure of allyl acetate.

It is an object of this invention to provide a process for producing bismonocarboxylic esters of 3-formylbutanediol-1,2 which have not previously been accessible.

Another object of this invention is to provide a process which gives the said esters in good yields and is easy to carry out.

In accordance with this invention these and other objects and advantages are achieved in a process for the production of bismonocarboxylic esters of 3-formylbutanediol-1,2 which comprises reacting a bismonocarboxylic ester of butene-1-diol-3,4 with carbon monoxide and hydrogen in the presence of a carbonyl complex of rhodium at elevated temperature and superatmospheric pressure.

Preferred bismonocarboxylic esters of butene-1-diol-3,4 are esters with saturated fatty acids having one to eighteen carbon atoms and benzoic acid which may be substituted by one or two alkoxy or alkyl groups having one to four carbon atoms, chlorine atoms or nitro groups. Esters of saturated fatty acids having one to eighteen carbon atoms, particularly those having one to four carbon atoms, are particularly preferred. Examples of suitable starting materials are butene-1-diol-3,4 diformate, butene-1-diol - 3,4 diacetate, butene-1-diol-3,4, dipropionate, butene-1-diol-3,4 dipalmitate, butene-1-diol-3,4-dibenzoate and butene-1-diol-3,4 diparachlorobenzoate.

Carbon monoxide and hydrogen are generally used in a ratio by volume of 2:1 to 1:2, particularly in about the ratio by volume of 1:1. It is possible to use the bismonocarboxylic ester of butene-1-diol-3,4 and the mixture of carbon monoxide for example in amounts ranging from stoichiometric amounts to an excess of 50% molar.

The reaction is advantageously carried out at temperatures of from 60° to 120° C. Particularly favorable results are obtained by using temperatures of from 80° to 105° C. Pressures of from 300 to 1200 atmospheres are generally used in the reaction. It is preferred to carry out the reaction at pressures of from 500 to 700 atmospheres.

The reaction is carried out in the presence of a carbonyl complex of rhodium. It is possible to prepare the carbonyl complex prior to the oxo reaction in a separate operation or the starting materials for the carbonyl complex such as halides, oxides or fatty acid salts of rhodium may be added separately to the reaction. The catalyst then forms under the reaction conditions. It is preferred to use from 0.00005 to 0.05% by weight of rhodium (calculated as metal) based on the amount of bismonocarboxylic ester of butene-1-diol-3,4 used. Amounts of from 0.0001 to 0.01% of rhodium have proved to be particularly advantageous.

It is possible to carry out the reaction without using an inert solvent. On the other hand it is also possible to carry out the reaction in the presence of solvents which are inert under the reaction conditions such as hydrocarbons, as for example benzene, cyclohexane, xylene or hexane; ethers such as diethyl ether, tetrahydrofuran or dioxane; or esters such as ethyl acetate.

The process according to the invention may be carried out for example by placing the bismonocarboxylic ester of butene-1-diol-3,4, with or without an inert solvent and with the said amount of catalyst in a high pressure vessel and reacting it at the said pressures and temperatures with a mixture of carbon monoxide and hydrogen of the specified composition. After the reaction mixture has been decompressed and cooled, it is separated from the catalyst by distillation. The bismonocarboxylic ester of 3-formylbutanediol-1,2 is then isolated from the mixture thus obtained, for example by fractional distillation. The reaction may be carried out continuously in a simple manner in appropriate equipment.

This bismonocarboxylic esters of 3-formylbutanediol-1,2 prepared by the process according to the invention are converted, by elimination of a carboxylic ester, into β-formylcrotyl ester from which vitamin A ester can be prepared according to the following equation:

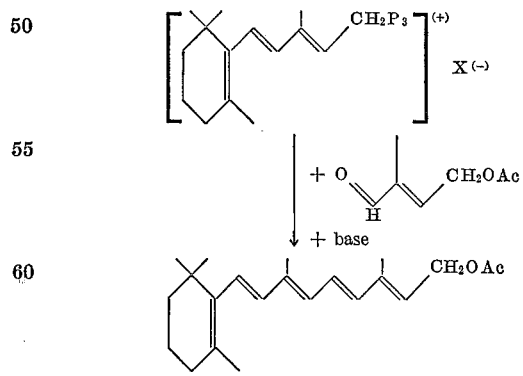

The following examples illustrate the invention. The parts given in the examples are parts by weight. They bear the same relation to parts by volume as the kilogram to the liter.

EXAMPLE 1

150 parts of butene-1-diol-3,4 diacetate, 200 parts of benzene and 0.15 part of rhodium(III) chloride are placed in a high pressure reactor of stainless steel having a capacity of 700 parts by weight. After the air has been expelled from the autoclave by forcing nitrogen in up to 20 atmospheres, three times and then decompressing at room temperature, the autoclave is charged with a mixture of equal parts by volume of carbon monoxide and hydrogen up to a pressure of 100 atmospheres. The reactor is then heated to 100° C. and the said gas mixture is forced in to such an extent that a pressure of 700 atmospheres is maintained. 310 atmospheres of the gas mixture is forced in within three hours. The reactor is then cooled and vented. 365 parts of reaction product is obtained from which, by fractional distillation, 256 parts of 3-formylbutanediol-1,2- diacetate is obtained having a boiling point of 94° to 100° C. at 0.4 to 0.5 mm. and a refractive index of 1.4385.

EXAMPLE 2

6000 parts of butene-1-diol-3,4-diacetate and 0.05 part of dimeric cyclooctadiene rhodium chloride having the formula: $(C_8H_{12}RhCl)_2$ are placed in a high pressure vessel having a capacity of 10,000 parts by volume. This mixture is reacted as described in Example 1 for fourteen hours at 600 atmospheres gauge with a mixture of equal parts by volume of carbon monoxide and hydrogen. After cooling and decompression, 6887 parts of reaction product is obtained, from which, by fractional distillation, 4805 parts (70% of the theory) of 3-formylbutanediol-1,2 diacetate is obtained.

EXAMPLE 3

150 parts of butene-1-diol-3,4 diformate, 600 parts of benzene and 0.03 part of dimeric octadiene rhodium chloride are placed in a high pressure vessel and the reaction is carried out as described in Example 1 at a pressure of 700 atmospheres gauge with a mixture of equal parts by volume of carbon monoxide and hydrogen at 100° C. for six hours. After cooling and decompression, 157 parts of a mixture is obtained which according to gas chromatographic analysis contains 100 parts of 3-formylbutanediol-1,2 diformate.

EXAMPLE 4

A mixture of 150 parts of butene-1-diol-3,4 dibenzoate, 300 parts of benzene and 0.05 part of triphenyl phosphine rhodium chloride is reacted as described in Example 3.

The consumption of gas is 140 atmospheres within six hours. After the reaction is over, 157 parts of a reaction product is obtained which has not yet been capable of separation by distillation. By eliminating benzoic acid with 0.2 part of sodium acetate at 100° C., 29 parts of 3-formylcrotyl benzoate having a melting point of from 44° to 46° C. is obtained.

We claim:

1. A bismonocarboxylic ester of 3-formylbutanediol-1,2 having the formula:

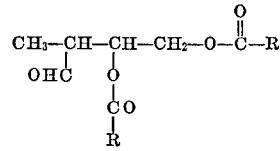

in which R denotes alkyl of from one to seventeen carbon atoms or phenyl which phenyl may bear, as substituents, one or two alkoxy or alkyl groups having one to four carbon atoms, chlorine atoms or nitro groups.

2. An ester as disclosed in claim 1 wherein R is an alkyl of 1 to 3 carbons.

3. An ester as disclosed in claim 1 wherein R is phenyl.

References Cited

UNITED STATES PATENTS 2,880,241   3/1959   Hughes _____ 260—604

FOREIGN PATENTS 980,239   1/1965   Great Britain.

OTHER REFERENCES

Adkins et al.: "Hydroformylation of Unsaturated Compounds with a Cobalt Carbonyl Catalyst," J. Am. Chem. Soc., vol. 71, pp. 3051–5 (1949).

LEWIS GOTTS, Primary Examiner

D. G. RIVERS, Assistant Examiner

U.S. Cl. X.R.

260—410.6, 471 R, 473 R, 488 J, 488 H, 491, 488 A